United States Patent
Minh et al.

(10) Patent No.: US 8,005,770 B2
(45) Date of Patent: Aug. 23, 2011

(54) PARALLEL GENERATION OF A BAYESIAN NETWORK

(75) Inventors: Chi Cao Minh, Stanford, CA (US); Max Chickering, Bellevue, WA (US); John Feo, Issaquah, WA (US); Jaime Hwacinski, Sammamish, WA (US); Anitha Panapakkam, Sammamish, WA (US); Khaled Sedky, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 744 days.

(21) Appl. No.: 12/135,613

(22) Filed: Jun. 9, 2008

(65) Prior Publication Data

US 2009/0307160 A1 Dec. 10, 2009

(51) Int. Cl.
*G06F 15/18* (2006.01)
*G06F 17/30* (2006.01)
*G06F 7/00* (2006.01)

(52) U.S. Cl. ............. 706/12; 706/20; 706/26; 707/797; 707/764

(58) Field of Classification Search .............. 706/12
See application file for complete search history.

(56) References Cited

U.S. PATENT DOCUMENTS

| | | | |
|---|---|---|---|
| 6,519,599 B1 | 2/2003 | Chickering et al. | |
| 6,807,537 B1 | 10/2004 | Thiesson et al. | |
| 6,895,398 B2* | 5/2005 | Evans-Beauchamp et al. | 706/45 |
| 7,184,993 B2 | 2/2007 | Heckerman et al. | |
| 7,251,636 B2* | 7/2007 | Chickering et al. | 706/12 |
| 7,272,587 B1 | 9/2007 | Przytula | |
| 7,320,002 B2* | 1/2008 | Chickering | 1/1 |
| 7,324,981 B2 | 1/2008 | Chickering | |
| 2003/0220906 A1 | 11/2003 | Chickering | |
| 2006/0020568 A1 | 1/2006 | Cox et al. | |
| 2006/0112190 A1 | 5/2006 | Hulten et al. | |
| 2007/0094213 A1 | 4/2007 | Lai et al. | |
| 2007/0143338 A1 | 6/2007 | Wang et al. | |
| 2008/0010232 A1 | 1/2008 | Kant et al. | |
| 2008/0027890 A1 | 1/2008 | Chickering et al. | |

OTHER PUBLICATIONS

Chickering, David Maxwell, "A Transformational Characterization of Equivalent Bayesian Network Structures" 18 Pages.
Chickering, David Maxwell, "Learning Equivalence Classes of Bayesian-Network Structures", Journal of Machine Learning Research, Date: 2002, vol. 2, Publisher: MIT Press Cambridge, MA, USA, pp. 445-498.
Darwiche, et al., "Query DAGs: A Practical Paradigm for Implementing Belief-Network Inference", Journal of Articial Intelligence Research 6, Date: 1997, pp. 147-176.
Heckerman, David, "A Tutorial on Learning with Bayesian Networks", Technical Report, Date: Mar. 1999, 58 Pages.
Schwartz et al., "Multiobjective Bayesian Optimization Algorithm for Combinatorial Problems: Theory and Practice", Brno University of Technology, Undated; 13 pgs.

(Continued)

*Primary Examiner* — Jeffrey A Gaffin
*Assistant Examiner* — Nathan Brown, Jr.

(57) ABSTRACT

A method for generating a Bayesian network in a parallel manner is based on an initial model having a plurality of nodes. Each node corresponds to a variable of a data set and has a local distribution associated therewith. The method includes assigning a plurality of subsets of the nodes to a respective plurality of constructors. The plurality of constructors is operated in a parallel manner to identify edges to add between nodes in the initial model. The identified edges are added to the initial model to generate the Bayesian network. The edges indicate dependency between nodes connected by the edges.

20 Claims, 8 Drawing Sheets

OTHER PUBLICATIONS

Laumanns et la., "Bayesian Optimization Algorithms for Multi-Objective Optimization", ETH Zurich, Computer Engineering and Networks Laboratory; Undated; 10 pgs.

Chickering et al., "A Bayesian Approach to Learning Bayesian Networks with Local Structure", Undated; 10 pgs.

Chickering, David Maxwell, "Learning Bayesian Networks is NP-Complete", Computer Science Department, University of California at Los Angeles; Undated; pp. 121-130.

Pelikan et al., "Linkage Problem, Distribution Estimation and Bayesian Networks", Evolutionary Computation 8(3): 311-340; © 2000 by the Massachusetts Institute of Technology; 30 pgs.

Goldenberg et al., "Tractable Learning of Large Bayes Net Structures from Sparse Data", Proceedings of the 21st International Conference on Machine Learning, ©2004; 8 pgs.

Gurwicz et al., "Bayesian Class-Matched Multinet Classifier," SSPR & SPR 2006, LNCS 4109, ©2006, pp. 145-153.

* cited by examiner

PARALLEL GENERATION OF A BAYESIAN NETWORK

BACKGROUND

Bayesian networks have a variety of applications and are used for modeling knowledge in domains such as medicine, image processing, and decision support systems. For example, a Bayesian network can be used to calculate the probability of a patient having a specific disease, given the absence or presence of certain symptoms.

A Bayesian network is a representation of the probabilistic relationships among distinctions about the world. Each distinction, sometimes called a variable, can take on one of a mutually exclusive and exhaustive set of possible states. A Bayesian network can be expressed as a directed acyclic graph (DAG) where the variables correspond to nodes and the relationships (e.g., dependencies) between the nodes correspond to arcs or edges connecting various nodes. When there is an edge between two nodes, the probability distribution of the first node depends upon the value of the second node when the direction of the edge points from the second node to the first node. The absence of edges in a Bayesian network conveys conditional independencies. The DAG is acyclic in that there is no directed path that both emanates from a node and returns to the same node, where each edge in the path is traversed only once.

The variables in a Bayesian network can be discrete or continuous. A discrete variable is a variable that has a finite or countable number of states, whereas a continuous variable is a variable that has an infinite number of states. An example of a discrete variable is a Boolean variable. Such a variable can assume only one of two states: (e.g., "true" or "false"). An example of a continuous variable is a variable that may assume any real value between −1 and 1. Discrete variables have an associated probability distribution. Continuous variables have an associated probability density function ("density").

Methods for learning Bayesian networks from data have been developed. The learning problem can be considered a classic heuristic-search problem: given a Bayesian network structure, there is a "score" that measures how well that structure fits with the data. The task is to utilize a search algorithm to find a good network structure. Typically, once a good network structure has been identified, it is straightforward to estimate the corresponding conditional probability distributions. Traditional approaches to learning Bayesian networks typically perform a greedy search though DAG space.

For example, in a conventional approach, the structure of a Bayesian network is a DAG, and at each step of the learning process one considers adding an edge in the DAG. One may also consider deleting or reversing an edge at each step. Typically, the process begins with a DAG containing no edges, and greedily performs these three operators (adding, deleting, or reversing) until a local maximum is reached.

Typically, Bayesian networks are learned or generated using a sequential algorithm. Such sequential algorithms are typically executed with a single processor or thread, which may be slower and less efficient than a parallel algorithm that can be executed concurrently by multiple processors or threads.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A Bayesian network is generated in a parallel manner based on an initial model having a plurality of nodes. Each node corresponds to a variable of a data set and has an associated local distribution. A plurality of subsets of the nodes is assigned to a respective plurality of constructors. The plurality of constructors is operated in a parallel manner to identify edges to add between nodes in the initial model. The identified edges are added to the initial model in such a way that no directed cycle is created, and thus the resulting model is a valid Bayesian network. The edges indicate dependency between nodes connected by the edges.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
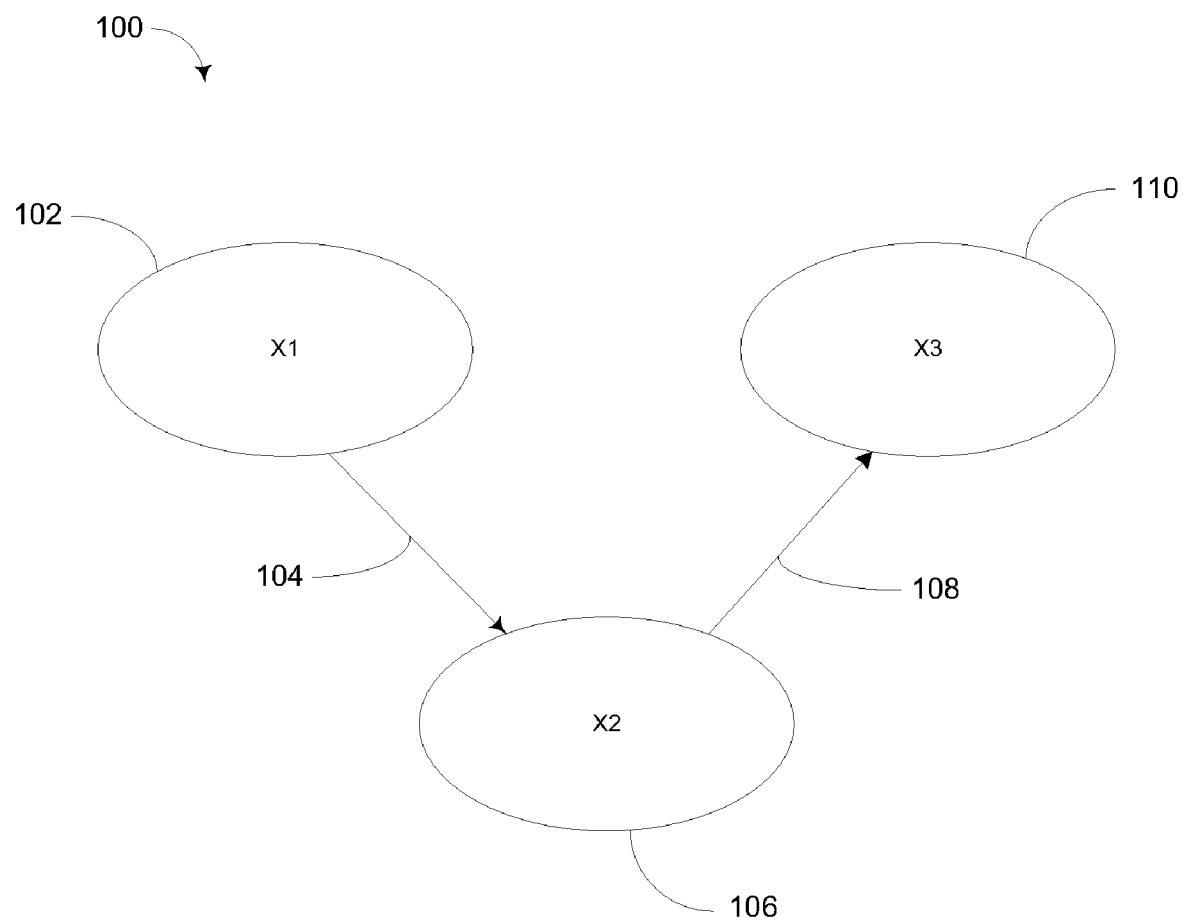
FIG. 1 is a diagram illustrating an example of a Bayesian network.

FIG. 1 is a diagram illustrating an example of a Bayesian network 100. Bayesian network 100 includes three variables, $X_1$, $X_2$, and $X_3$, which are represented by nodes 102, 106, and 110, respectively. Bayesian network 100 also includes two arcs or edges 104 and 108. The edges 104 and 108 indicate dependency between the nodes connected by the edges. Associated with each variable in a Bayesian network is a set of probability distributions. Using conditional probability notation, the set of probability distributions for a variable can be denoted by $p(x_i|\Pi_i, \xi)$, where "p" refers to the probability distribution, where "$\Pi_i$" denotes the parents of variable $x_i$, and where "$\xi$" denotes the knowledge of an expert. The Greek letter "$\xi$" indicates that the Bayesian network reflects the knowledge of an expert in a given field. Thus, this expression reads as follows: the probability distribution for variable $x_i$ given the parents of $x_i$ and the knowledge of the expert. For example, $X_1$ in Bayesian network 100 is the parent of $X_2$, and $X_2$ is the child of $X_1$, as indicated by the edge 104 that begins at node 102 and ends (points to) node 106. The probability distributions specify the strength of the relationships between variables. For instance, if $X_1$ has two states (true and false), then associated with $X_1$ is a single probability distribution $p(x_1|\xi)$ and associated with $X_2$ are two probability distributions $p(x_2|x_1=t, \xi)$ and $p(x_2|x_1=f, \xi)$.

Figure 2:
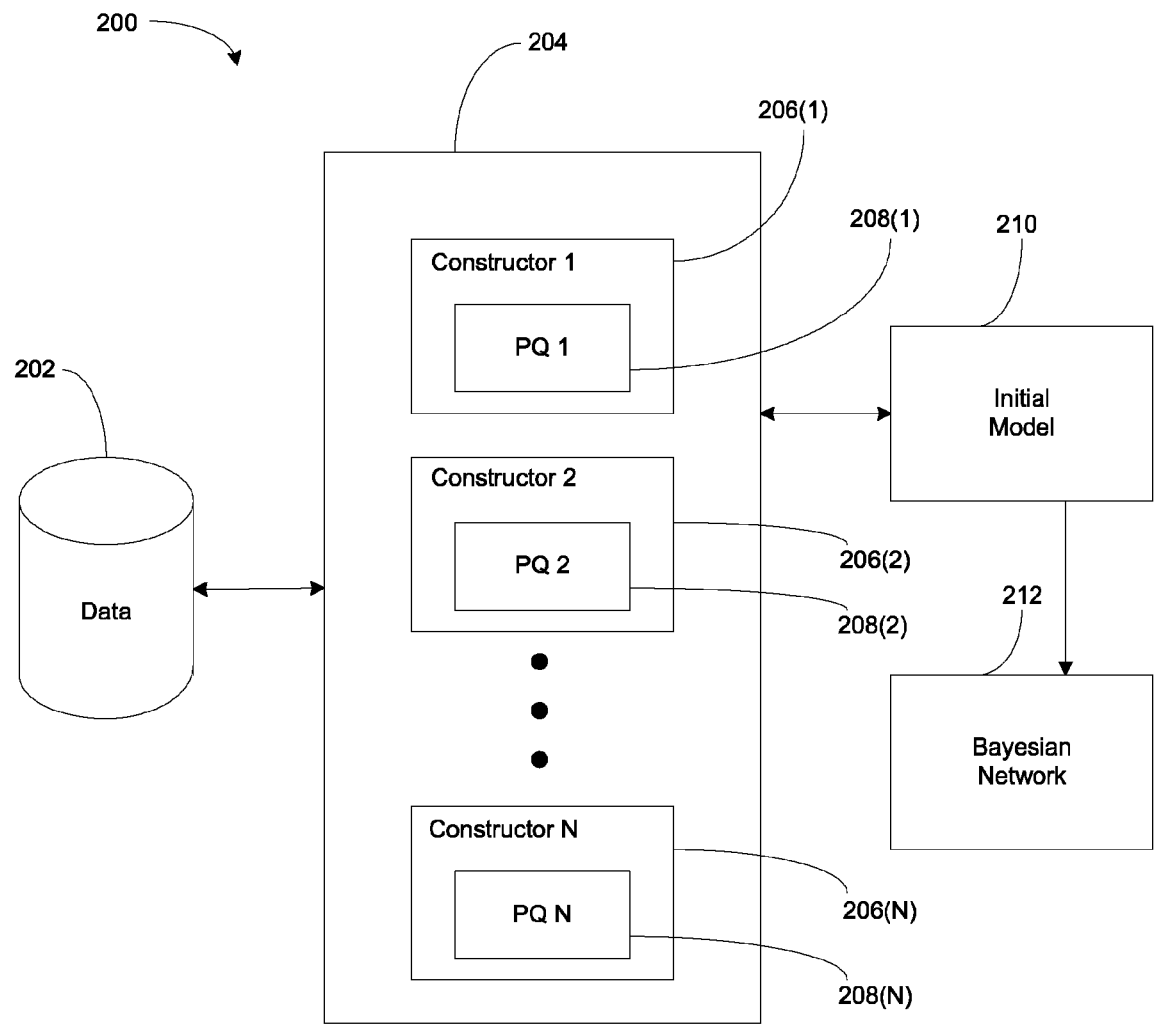
FIG. 2 is a diagram illustrating a system for learning a Bayesian network in a parallel manner according to one embodiment.

FIG. 2 is a diagram illustrating a system 200 for learning a Bayesian network (e.g., a Directed Acyclic Graph or DAG) in a parallel manner in accordance with one embodiment. The system 200 includes data 202, parallel Bayesian network construction system 204, initial model 210, and Bayesian network 212. System 204 includes a plurality of Bayesian network constructors 206(1)-206(N) (collectively referred to as constructors 206), where N according to one embodiment is an integer greater than one. The constructors 206(1)-206(N) include priority queues (PQs) 208(1)-208(N), respectively. The priority queues 208(1)-208(N) are collectively referred to as priority queues 208. In one embodiment, the constructors 206 are implemented with a multi-processor system and each individual constructor 206 corresponds to one of the processors (threads) in the multi-processor system.

The learning begins with initial model 210. The initial model 210 according to one embodiment is generated by system 204 and includes one or more nodes corresponding to variables corresponding to the data domain defined by the data 202, and a local probability distribution (local distribution) for each node. In one embodiment, the initial model 210 includes no edges interconnecting the nodes. In other embodiments, other initial model configurations are used, such as an initial model that includes nodes and edges generated from a reasonable approximation based on the data domain. For example, a knowledge engineer can define the initial model 210 from the data 202 based on previously observed empirical data and/or expert knowledge for the domain for which the model applies.

In one embodiment, constructors 206 work in parallel to add identified edges to the initial model 210 to step-by-step improve the initial model 210, and when the process is complete, the initial model 210 becomes a completed Bayesian network 212. The edges indicate dependency between the nodes connected by the edges. In one embodiment, each of the constructors 206 employs a heuristic search technique, such as a local greedy search technique, to identify a "best" edge at each step of the process. The term "best" edge according to one embodiment means an edge that does not introduce a cycle into the initial model 210 and that has the highest score amongst all of the edges considered, or that produces an overall score for the initial model 210 that is higher than that which would be produced by the other edges considered. A cycle according to one embodiment means a path that both emanates from a node and returns to the same node, where each edge in the path is traversed only once.

In other embodiments, the constructors 206 employ other heuristic search techniques, such as a greedy search with restarts, a best-first search, or a Monte-Carlo search technique. In one embodiment, the constructors 206 obtain edge scores or weights for various possible edges, and determine the best edges (e.g., the edge with the highest score) based on the edge scores. The quality or score of each edge may be expressed, for example, by the Bayes-Dirichlet (BD) metric. In one embodiment, the initial model 210 is a directed acyclic graph (DAG) that includes edge scores for all potential edges. The highest scoring edges identified by the constructors 206 are added to the initial model 210.

In the illustrated embodiment, each constructor 206 includes a corresponding priority queue 208. In one embodiment, edges identified by the constructors 206 are stored in the priority queues 208, with each priority queue 208 corresponding to one of the constructors 206 and storing edges identified by the corresponding constructor 206. In one embodiment, each constructor 206 stores the best edges identified by that constructor 206 in its corresponding priority queue 208 along with associated priority information (e.g., an edge score) for each edge stored therein, and with node information identifying the parent node for the edge. The priority queues 208 according to one embodiment sort the best edges stored therein based on the scores associated with the edges. In this manner, the best edges stored in each priority queue 208 are ranked from highest score to lowest score. When a constructor 206 wishes to add an edge from its priority queue 208 to the initial model 210, the highest scoring edge in the priority queue is removed from the priority queue by the constructor 206 and inserted into the initial model 210. Thus, the stored edges according to one embodiment are output from the priority queues 208 and added to the initial model 210 in rank order from highest priority to lowest priority (e.g., from highest scoring edge to lowest scoring edge).

Figure 3:
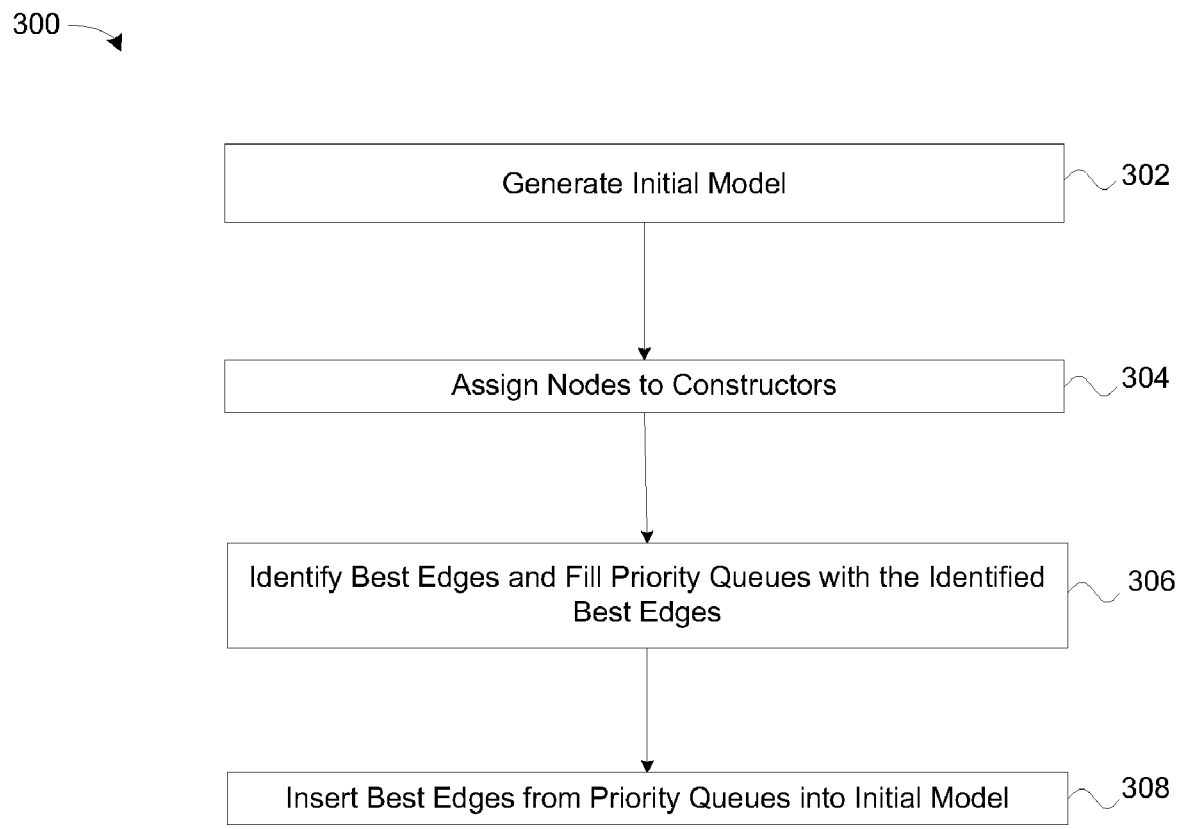
FIG. 3 is a flow diagram illustrating a method of generating a Bayesian network in a parallel manner according to one embodiment.

FIG. 3 is a flow diagram illustrating a method 300 of generating a Bayesian network in a parallel manner according to one embodiment. In one embodiment, system 204 (FIG. 2) is configured to perform method 300. At 302 in method 300, system 204 generates an initial model 210. In one embodiment, the initial model 210 includes a plurality of nodes, with each node corresponding to a variable in the data set 202, and a local distribution associated with each node. In one embodiment, the initial model 210 includes no edges interconnecting the nodes.

At 304, system 204 assigns a subset of the nodes in the initial model 210 to each constructor 206. In one embodiment, system 204 assigns a plurality of subsets of the nodes to a respective plurality of constructors 206. In one embodiment, at 304, system 204 statically partitions the complete set of nodes in initial model 210 into a plurality of different subsets, and assigns each subset to one of the constructors 206. Thus, each constructor 206 is assigned a different subset of the nodes in initial model 210 in one embodiment.

At 306, the constructors 206 identify best edges (e.g., the edges with the highest associated scores) for the initial model 210, and fill their corresponding priority queues 208 with the identified best edges. The plurality of constructors 206 operate in a parallel manner in one embodiment to perform a parallel analysis of the nodes in the initial model 210 and identify edges to add between nodes in the initial model 210 based on the parallel analysis. In one embodiment, each of the constructors 206 identifies one best edge for each of the nodes assigned to that constructor 206. In one embodiment, the constructors 206 each identify only the best edges that originate from the nodes assigned to that constructor 206 (e.g., the edges for which the parent node is assigned to that constructor 206). Thus, the best edges identified by any given constructor 206 according to one embodiment will all originate from the nodes assigned to that constructor 206, and may or may not end with (i.e., point to) a node (i.e., a child node) assigned to that constructor 206. After 306, according to one embodiment, each constructor 206 will have stored at most one best edge in its priority queue 208 for each node assigned to that constructor 206. The identification of best edges and filling of the priority queues 208 according to one embodiment is described in further detail below with reference to FIG. 4.

At 308, the constructors 206 insert the best edges stored in their priority queues 208 into the initial model 210, and thereby generate a Bayesian network 212. In one embodiment, each constructor 206 determines and inserts its own best edge only from local information without exchanging information with other constructors 206. Thus, the embodiment uses a local greedy (or relaxed greedy) technique. Learning Bayesian networks is "NP-complete", which is a complexity class in computational complexity theory. Because it is NP-complete, heuristic search methods are used to identify a good solution. One such method is a relaxed greedy search which applies score-improving edge operations in each step, where the edge at each step is not necessarily the one that improves the score the most out of all edges. More specifically, instead of inserting the absolute best edge at each step, the relaxed greedy search according to one embodiment inserts a set of locally better edges. By exploiting this property, each constructor 206 inserts the best edge from its own local priority queue 208, and globally, the serialized insertion order appears as a relaxed greedy search.

In another embodiment, the best edges are determined and inserted based on a strict greedy search. In one form of this embodiment, all of the priority queues 208 are merged into a common or shared priority queue, and then all of the constructors 206 contend for the top of the shared priority queue. Insertion of best edges from the priority queues 208 according to one embodiment is described in further detail below with reference to FIG. 5.

By partitioning the nodes among the constructors 206 and giving each constructor 206 its own local priority queue 208 to perform a parallel generation of Bayesian network 212, method 300 according to one embodiment provides better and faster performance than sequential algorithms. In one embodiment, static partitioning is used at 304 in method 300 to evenly divide or partition the complete set of nodes among the constructors 206. Since the number of edges that can be inserted per variable varies, the static partitioning of nodes can result in workload imbalances between the constructors 206. In one embodiment, any workload imbalances that may arise from this partitioning are addressed and compensated by using work stealing (e.g., constructors 206 that complete their edge insertion steal nodes from other constructors 206 that are still working on the edge insertion).

Figure 4:
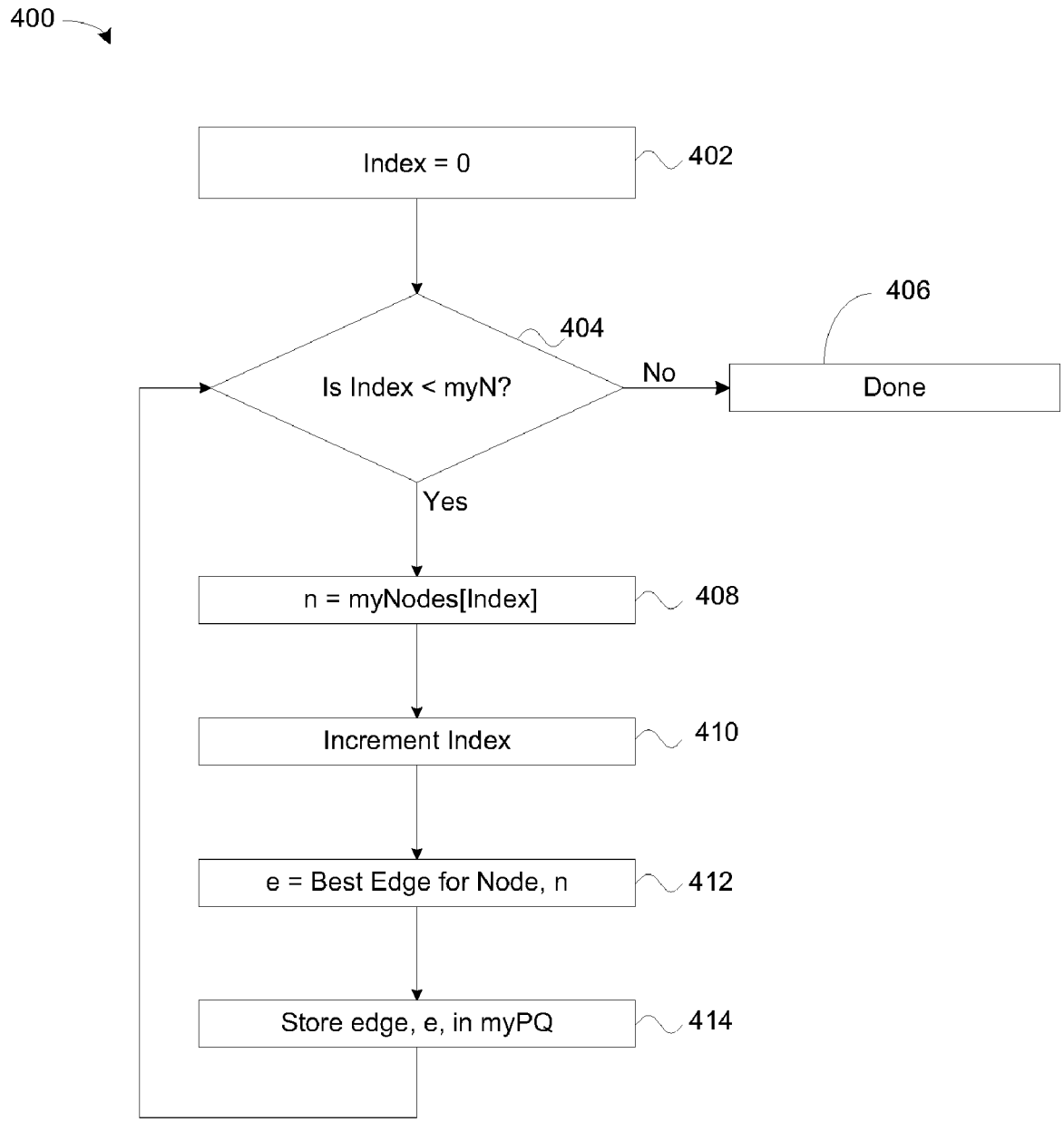
FIG. 4 is a flow diagram illustrating a method of identifying best edges and filling a priority queue according to one embodiment.

As mentioned above, at 306 in method 300, the constructors 206 identify best edges for the initial model 210, and fill their corresponding priority queues 208 with the identified best edges. FIG. 4 is a flow diagram illustrating a method 400 of identifying best edges and filling a priority queue 208 according to one embodiment. In one embodiment, each of the constructors 206 is configured to perform method 400. To simplify the explanation, method 400 will be described with respect to constructor 206(1).

At 402 in method 400, constructor 206(1) sets an index equal to zero. At 404, the constructor 206(1) determines whether the index is less than myN, where myN represents the number of nodes in the initial model 210 that were assigned to constructor 206(1) at 304 in method 300. If it is determined by the constructor 206(1) at 404 that the index is not less than myN, the method 400 moves to 406, indicating that the method 400 is done. If it is determined by the constructor 206(1) at 404 that the index is less than myN, the method 400 moves to 408.

At 408, constructor 206(1) sets the variable n equal to myNodes[index], where myNodes is a variable representing the set of nodes assigned to the constructor 206(1). Thus, since the index was set to zero at 402, the variable n during this iteration represents the first node (myNodes[0]) in the set of nodes assigned to the constructor 206(1). At 410, the index is incremented (e.g., index=index+1, or index++).

At 412, constructor 206(1) identifies the best edge for node, n, where the best edge is represented by the variable, e, (i.e., e=best edge for node n). At 414, constructor 206(1) stores the best edge, e, in its priority queue (myPQ) 208(1) along with the associated priority information (e.g., edge score) for the identified best edge. The method 400 then returns to 404 to determine if there are any more nodes assigned to constructor 206(1) that remain to be evaluated.

Figure 5:
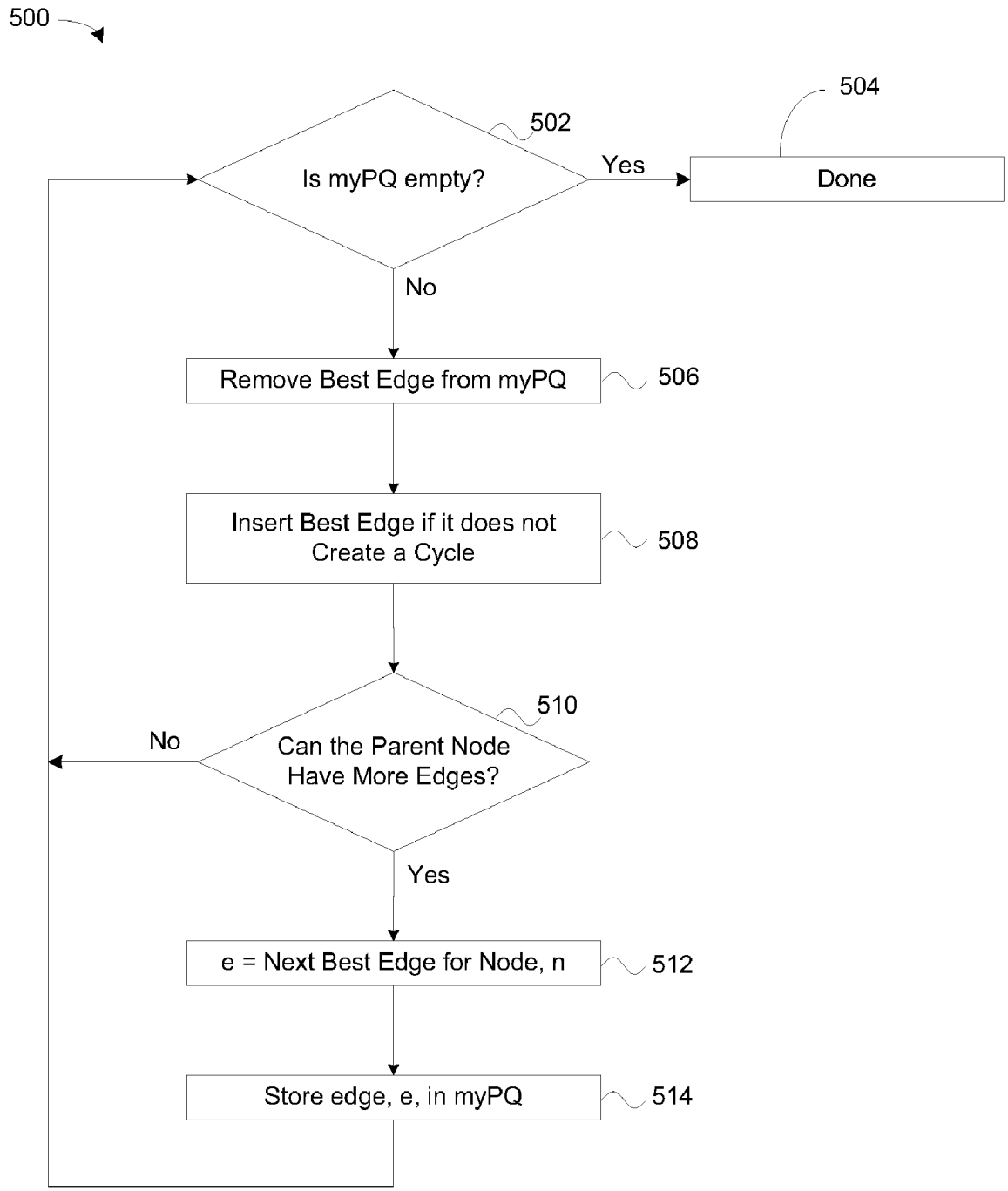
FIG. 5 is a flow diagram illustrating a method of inserting best edges from priority queues according to one embodiment.

As mentioned above, at 308 in method 300, the constructors 206 insert the best edges stored in their priority queues 208 into the initial model 210, and thereby generate a Bayesian network 212. FIG. 5 is a flow diagram illustrating a method 500 of inserting best edges from the priority queues 208 according to one embodiment. In one embodiment, each of the constructors 206 is configured to perform method 500. To simplify the explanation, method 500 will be described with respect to constructor 206(1).

At 502 in method 500, constructor 206(1) determines whether its priority queue (myPQ) 208(1) is empty. If it is determined by constructor 206(1) at 502 that its priority queue 208(1) is empty, the method 500 moves to 504, indicating that the method 500 is done. If it is determined by constructor 206(1) at 502 that its priority queue 208(1) is not empty, the method 500 moves to 506.

At 506, constructor 206(1) removes a best edge from its priority queue 208(1). As mentioned above with respect to FIG. 2, the edges according to one embodiment are taken from the priority queues 208 in rank order from highest priority to lowest priority (e.g., from highest edge score to lowest edge score). Thus, in one embodiment, the edge removed from the priority queue 208(1) at 506 represents the highest ranking edge currently stored in the priority queue 208(1).

At 508, constructor 206(1) inserts the best edge removed from the priority queue at 506 into the initial model 210 if the best edge will not create a cycle in the initial model 210. In one embodiment, if the best edge will create a cycle in the initial model 210, the constructor 206(1) does not insert the edge.

At 510, constructor 206(1) determines whether the parent node of the best edge removed from the priority queue at 506 can have any more edges. If it is determined by the constructor 206(1) at 510 that the parent node of the best edge removed from the priority queue at 506 can not have any more edges, the method 500 returns to 502. If it is determined by the constructor 206(1) at 510 that the parent node of the best edge removed from the priority queue at 506 can have more edges, the method 500 moves to 512.

At 512, constructor 206(1) identifies the next best edge for the parent node of the best edge removed from the priority queue at 506. The next best edge identified at 512 is represented by the variable, e (i.e., e=next best edge for node, n). At 514, constructor 206(1) stores the next best edge, e, in its priority queue (myPQ) 208(1) along with the associated priority information (e.g., edge score) for the next best edge. The method 500 then returns to 502 to determine if there are any more edges in the priority queue 208(1) that remain to be evaluated.

Figure 6A:
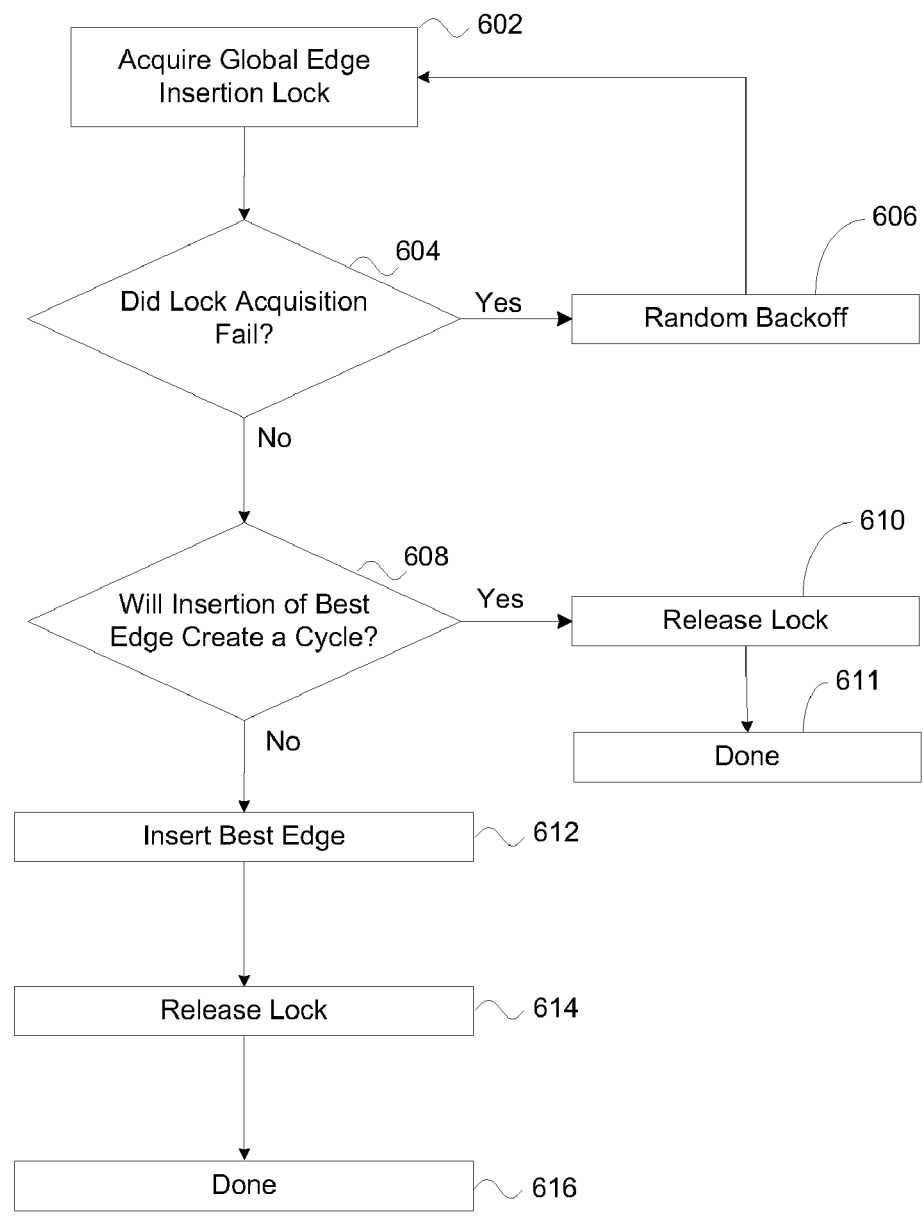
FIG. 6A is a flow diagram illustrating a method of determining whether inserting a best edge from a priority queue will create a cycle and inserting the best edge if it will not create a cycle according to one embodiment.

As mentioned above, at 508 in method 500, the constructor 206(1) inserts the best edge removed from the priority queue at 506 into the initial model 210 if the best edge will not create a cycle in the initial model 210. FIG. 6A is a flow diagram illustrating a method 600A of determining whether inserting a best edge from a priority queue 208 will create a cycle and inserting the best edge if it will not create a cycle according to one embodiment. In one embodiment, each of the constructors 206 is configured to perform method 600A. To simplify the explanation, method 600A will be described with respect to constructor 206(1).

In one embodiment, the initial model 210 is a global or shared model that is shared by all of the constructors 206. When multiple threads (e.g., constructors 206) can concurrently execute code that writes to or modifies a shared resource, such as initial model 210, conflicts can occur. In one embodiment, constructors 206 use a synchronization process including one or more thread synchronization locks (e.g., per-node reader locks, per-node writer locks, and/or a global edge insertion lock) to prevent conflicts between the constructor threads 206, such as during the addition of edges to the initial model 210. These locks are described in further detail below with reference to FIGS. 6A and 6B.

At 602 in method 600A, constructor 206(1) attempts to acquire a global edge insertion lock (global lock). A global edge insertion lock on the initial model 210 according to one embodiment allows a constructor 206 to add an edge to the initial model 210, and prevents other constructors 206 from adding an edge to the initial model 210 while it is locked. The global edge insertion lock helps to prevent an error that can occur if the concurrent insertion of edges results in the creation of a cycle (thus violating the acyclic property of Bayesian networks). To guard against this, the global edge insertion lock is used in one embodiment so that only one constructor 206 can insert an edge at a time.

At 604, constructor 206(1) determines whether the lock acquisition attempt at 602 failed. If it is determined by constructor 206(1) at 604 that the lock acquisition failed, the method 600A moves to 606. At 606, constructor 206(1) waits a random period of time (i.e., a random backoff), and the method 600A then returns to 602 to repeat the acquisition of the global lock. If it is determined by constructor 206(1) at 604 that the lock acquisition did not fail, the method 600A moves to 608.

At 608, constructor 206(1) determines whether the insertion of the best edge removed from the priority queue 208(1) at 506 in method 500 will create a cycle. If it is determined by constructor 206(1) at 608 that the addition of the best edge to the initial model 210 will create a cycle, the method 600A moves to 610. At 610, constructor 206(1) releases the lock that it acquired at 602, and then the method 600A moves to 611, indicating that the method 600A is done, and the best edge is not inserted. If it is determined by constructor 206(1) at 608 that the addition of the best edge to the initial model 210 will not create a cycle, the method 600A moves to 612.

At 612, constructor 206(1) inserts the best edge removed from the priority queue at 506 in method 500 into the initial model 210. At 614, constructor 206(1) releases the lock that it acquired at 602, and then the method 600A moves to 616, indicating that the method 600A is done.

Figure 6B:
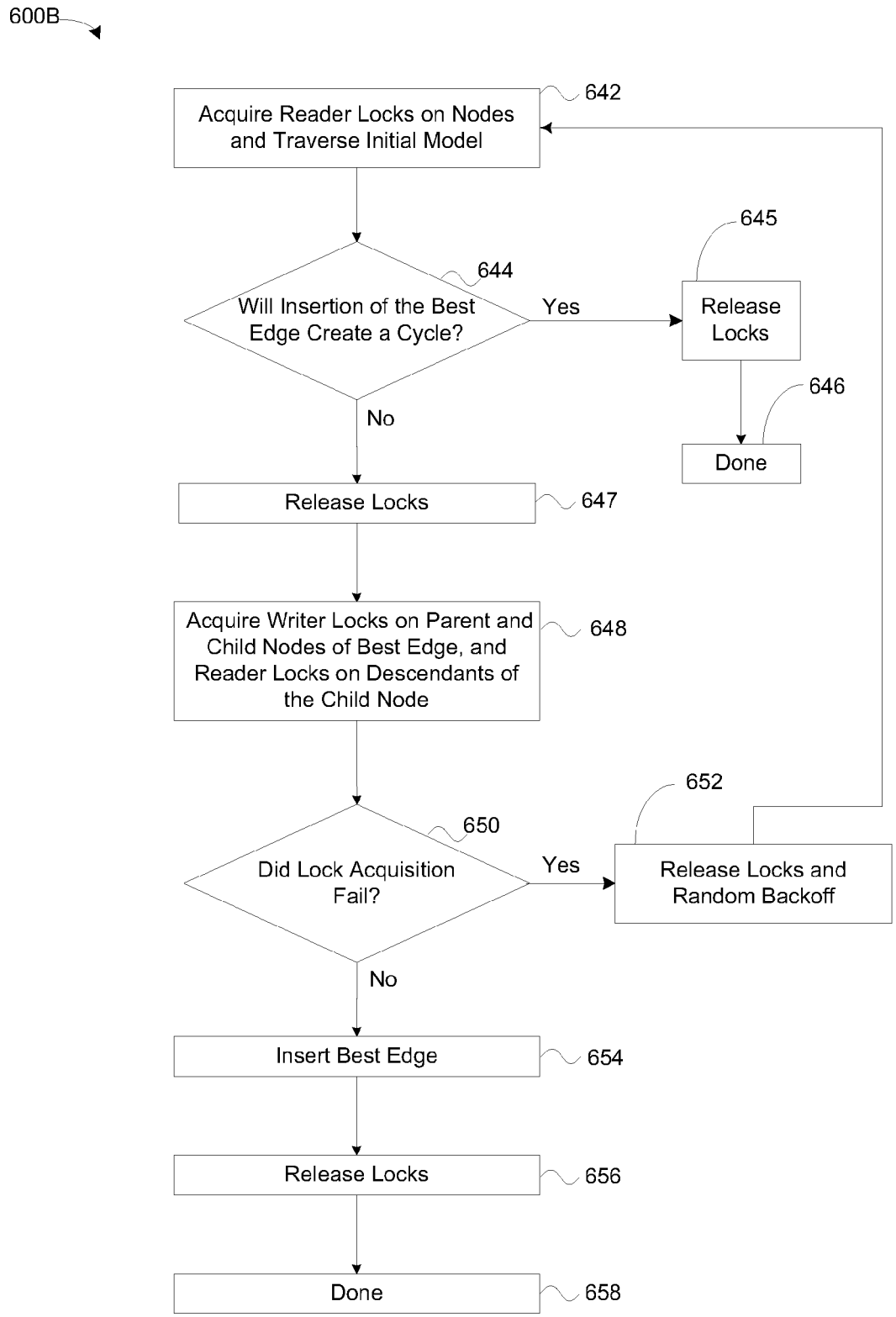
FIG. 6B is a flow diagram illustrating a method of determining whether inserting a best edge from a priority queue will create a cycle and inserting the best edge if it will not create a cycle according to another embodiment.

FIG. 6B is a flow diagram illustrating a method 600B of determining whether inserting a best edge from a priority queue 208 will create a cycle and inserting the best edge if it will not create a cycle according to another embodiment. The method 600B according to one embodiment does not use a global edge insertion lock, such as that used at 602 in method 600A, but rather uses per-node reader and writer locks on selected nodes in the initial model 210. In one embodiment, each of the constructors 206 is configured to perform method 600B. To simplify the explanation, method 600B will be described with respect to constructor 206(1).

At 642 in method 600B, constructor 206(1) traverses the initial model 210 by first traveling along the best edge from parent to child and then visiting each descendent of the child, and acquires a reader lock for each node. A reader lock according to one embodiment is a per-node or node-specific lock that allows a constructor 206 to read a node (e.g., such as edges connected to that node) and prevents other constructors 206 from writing to that node (e.g., such as adding an edge to that node) that is locked by the reader lock. Multiple constructors 206 may obtain a reader lock for a given node to concurrently read the node, but if a given node is protected or locked by one or more reader locks, other constructors 206 are prevented from writing to or modifying that node (e.g., prevented from adding an edge to that node). Acquiring a reader lock for each node that constructor 206(1) traverses at 642 helps to ensure that these nodes cannot be modified by another constructor 206 during the traversal, and allows for safe concurrent edge insertion.

At 644, constructor 206(1) determines based on the traversal through the initial model 210 at 642 whether the insertion of the best edge removed from the priority queue 208(1) at 506 in method 500 will create a cycle. If it is determined by constructor 206(1) at 644 that the insertion of the best edge into the initial model 210 will create a cycle, the method 600B moves to 645. At 645, the constructor 206(1) releases the reader locks acquired previously, and method 600B moves to 646 indicating that the method 600B is done, and the best edge is not inserted. If it is determined by constructor 206(1) at 644 that the insertion of the best edge into the initial model 210 will not create a cycle, the method 600B moves to 647. At 647, the constructor 206(1) releases the reader locks acquired previously, and method 600B moves to 648.

At 648, constructor 206(1) attempts to acquire writer locks on the parent and child nodes of the best edge removed from the priority queue 208(1) at 506 in method 500, and also attempts to acquire reader locks on all of the descendant nodes of the child node. A writer lock according to one embodiment is a per-node or node-specific lock that allows a constructor 206 to write to or modify a node (e.g., such as adding an edge connected to that node) and prevents other constructors 206 from reading from or writing to that node that is locked by the writer lock. Deadlock between reader and writer threads is prevented in one embodiment by locking parent nodes before children nodes.

At 650, constructor 206(1) determines whether any of the lock acquisition attempts at 648 have failed. If it is determined by constructor 206(1) at 650 that a lock acquisition failed, the method 600B moves to 652. At 652, constructor 206(1) releases any locks that it had acquired, waits a random period of time (i.e., a random backoff), and the method 600B then returns to 642 to test anew whether a best edge will create a cycle. If it is determined by constructor 206(1) at 650 that the lock acquisitions did not fail, the method 600B moves to 654.

At 654, constructor 206(1) inserts the best edge removed from the priority queue at 506 in method 500 into the initial model 210. At 656, constructor 206(1) releases the locks that it had previously acquired, and then the method 600B moves to 658, indicating that the method 600B is done.

Method 600B according to one embodiment eliminates the global edge insertion lock used in method 600A, and allows concurrent writers (e.g., constructors 206 that concurrently insert edges in different parts of the initial model 210) by using per-node reader and writer locks. In another embodiment, concurrent insertion of edges by multiple constructors 206 is implemented without a global lock by using transactional memory.

Figure 7:
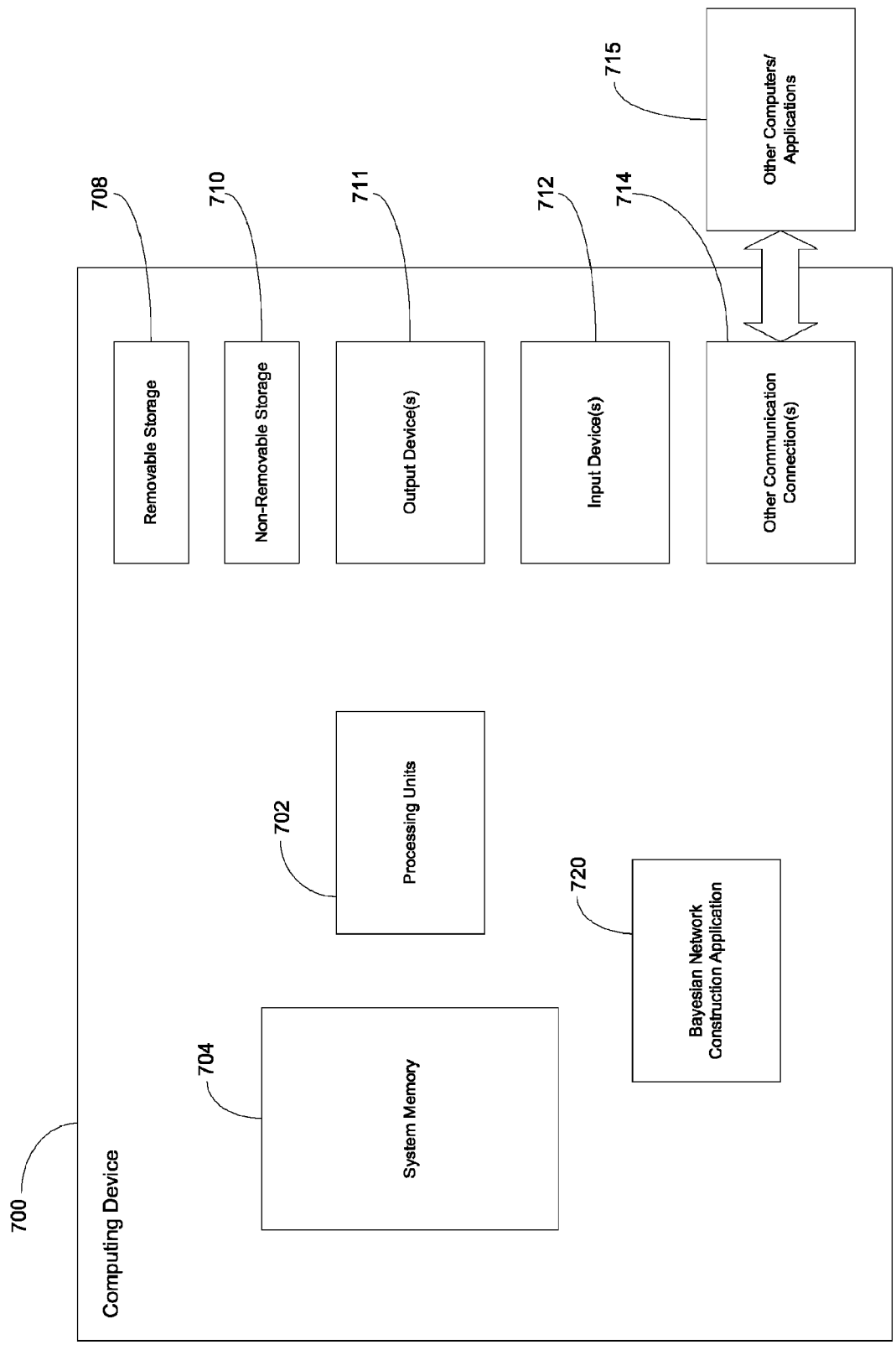
FIG. 7 is a diagram illustrating a computer system suitable for implementing the system for learning a Bayesian network shown in FIG. 2 according to one embodiment.

FIG. 7 is a diagram illustrating a computer system 700 suitable for implementing the system 200 (FIG. 2) for learning a Bayesian network according to one embodiment. In the illustrated embodiment, the computer system or computing device 700 includes a plurality of processing units (i.e., processors or threads) 702 and system memory 704. Depending on the exact configuration and type of computing device, memory 704 may be volatile (such as RAM), non-volatile (such as ROM, flash memory, etc.), or some combination of the two.

Computing device 700 may also have additional features/functionality. For example, computing device 700 may also include additional storage (removable and/or non-removable) including, but not limited to, magnetic or optical disks or tape. Such additional storage is illustrated in FIG. 7 by removable storage 708 and non-removable storage 710. Computer storage media includes volatile and nonvolatile, removable and non-removable media implemented in any suitable method or technology for storage of information such as computer readable instructions, data structures, program modules or other data. Memory 704, removable storage 708 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by computing device 700. Any such computer storage media may be part of computing device 700.

Computing device 700 includes one or more communication connections 714 that allow computing device 700 to communicate with other computers/applications 715. Computing device 700 may also include input device(s) 712, such as keyboard, pointing device (e.g., mouse), pen, voice input device, touch input device, etc. Computing device 700 may also include output device(s) 711, such as a display, speakers, printer, etc.

In one embodiment, computing device 700 includes Bayesian network construction application 720 for operation on computing device 700 to accomplish one or more of the functions described above with respect to FIGS. 2-6. In one embodiment, the plurality of processing units 102 are configured to execute application 720 and construct Bayesian network 212 (FIG. 2) in a parallel manner as described above with respect to FIGS. 2-6. In one form of this embodiment, each of the constructors 206 (FIG. 2) is implemented with and corresponds to a different one of the processing units 702, and the constructors 206 may also be referred to as constructor threads 206, with each constructor thread 206 having its own priority queue 208 (FIG. 2). Application 720 is one of the application programs that reside on computing device 700 in one embodiment. However, application 700 can alternatively or additionally be embodied as computer-executable instructions on one or more computers and/or in different variations than illustrated in FIG. 7. Alternatively or additionally, one or more parts of application 720 can be part of system memory 704, on other computers and/or applications 715, or other such suitable variations as would occur to one in the computer software art.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method for generating a Bayesian network in a parallel manner based on an initial model having a plurality of nodes, each node corresponding to a variable of a data set and having a local distribution associated therewith, the method comprising:
   assigning a plurality of subsets of the nodes to a respective plurality of constructors;
   operating the plurality of constructors in a parallel manner to identify edges to add between nodes in the initial model; and
   adding the identified edges to the initial model, thereby generating the Bayesian network, the edges indicating dependency between nodes connected by the edges.

2. The method of claim 1, wherein the initial model comprises a directed acyclic graph (DAG).

3. The method of claim 1, and further comprising:
   storing the identified edges in a plurality of priority queues, each priority queue corresponding to one of the constructors and storing edges identified by the corresponding constructor.

4. The method of claim 3, and further comprising:
   outputting stored edges from the priority queues; and
   adding the edges output from the priority queues to the initial model.

5. The method of claim 4, wherein the edges are output from each priority queue in order from a highest scoring edge to a lowest scoring edge.

6. The method of claim 1, and further comprising:
   acquiring a global lock on the initial model with a first one of the constructors, the global lock preventing other constructors from adding an edge to the initial model.

7. The method of claim 6, and further comprising:
   determining with the first constructor whether an identified edge will create a cycle if added to the initial model; and
   adding the identified edge to the initial model if it is determined by the first constructor that the addition of the edge will not create a cycle.

8. The method of claim 6, and further comprising:
   determining whether acquisition of the global lock failed;
   waiting for a random period of time if acquisition of the global lock failed; and
   repeating acquisition of the global lock.

9. The method of claim 1, and further comprising:
   acquiring reader locks on nodes in the initial model with a first one of the constructors, the reader locks preventing other constructors from adding an edge to the nodes locked by the reader locks.

10. The method of claim 9, and further comprising:
    determining with the first constructor whether an identified edge will create a cycle if added to the initial model.

11. The method of claim 10, and further comprising:
    acquiring writer locks on a parent node and a child node of the identified edge with the first constructor, the writer locks preventing other constructors from reading from and adding an edge to the nodes locked by the writer locks.

12. The method of claim 11, and further comprising:
acquiring reader locks on descendant nodes of the child node with the first constructor, the reader locks preventing other constructors from adding an edge to the nodes locked by the reader locks.

13. The method of claim 12, and further comprising:
adding the identified edge to the initial model if it is determined by the first constructor that the addition of the edge will not create a cycle.

14. The method of claim 12, and further comprising:
determining whether any lock acquisitions failed;
releasing all acquired locks and waiting a random period of time if it is determined that a lock acquisition failed; and
repeating a decision process to determine whether addition of an edge will create a cycle.

15. The method of claim 1, and further comprising:
performing work stealing to compensate for workload imbalances that occur between the plurality of constructors.

16. A computer-readable storage medium storing computer-executable instructions for performing a method comprising:
performing a parallel analysis of an initial model using a plurality of threads, the initial model having a plurality of nodes, each node corresponding to a variable of a data set and having a local distribution associated therewith;
adding edges between nodes in the initial model with the plurality of threads based on the parallel analysis, the edges indicating dependency between nodes to be connected by the edges; and
performing a synchronization process to prevent conflicts between the threads during the addition of edges to the initial model.

17. The computer-readable storage medium of claim 16, wherein the method further comprises:
identifying edges to add to the initial model during the parallel analysis using the plurality of threads; and
storing the identified edges in a plurality of priority queues, each priority queue corresponding to one of the threads and storing edges identified by the corresponding thread.

18. The computer-readable storage medium of claim 16, wherein the synchronization process comprises acquiring a global lock on the initial model with a first one of the threads, the global lock preventing other threads from adding an edge to the initial model.

19. The computer-readable storage medium of claim 16, wherein the synchronization process comprises acquiring per-node reader and writer locks on selected ones of the nodes, the reader locks preventing other threads from adding an edge to the locked nodes, the writer locks preventing other threads from reading from the locked nodes and adding an edge to the locked nodes.

20. A computer-implemented method for performing a parallel generation of a Bayesian network, the method comprising:
providing a data set having a plurality of variables;
constructing an initial model having a plurality of nodes, each node corresponding to a variable of the data set and having a local distribution associated therewith;
partitioning the plurality of nodes into a plurality of subsets of nodes;
performing a parallel analysis of the plurality of subsets of nodes with a plurality of constructor threads to identify edges to add to the initial model, the edges indicating dependency between nodes to be connected by the edges; and
adding the identified edges between nodes in the initial model with the plurality of constructor threads, thereby generating the Bayesian network.

* * * * *